United States Patent Office 3,433,797
Patented Mar. 18, 1969

3,433,797
2 - (PHENYL - 2 - PYRIDYL - HYDROXYMETHYL)- 6 - PHENYL - 6 - (2 - PYRIDYL)FULVENE, DERIVATIVES THEREOF AND DIMERS THEREOF
Chris Royce Rasmussen, Ambler, Elizabeth Landis Carson, Lansdale, and Richard Joseph Mohrbacher, Fort Washington, Pa., assignors to McNeil Laboratories, Inc., a corporation of Pennsylvania
No Drawing. Filed June 24, 1966, Ser. No. 560,063
U.S. Cl. 260—296                              5 Claims
Int. Cl. C07d 31/28, 33/38

ABSTRACT OF THE DISCLOSURE

The compounds herein are Diels-Alder adducts of two 6,6-disubstituted fulvenes, which adducts are useful as ultra-violet light absorbers.

This invention relates to novel adducts obtained from a Diels-Alder reaction with certain 6,6-disubstituted fulvenes and, more particularly, to such adducts obtained by the Diels-Alder condensation of two 6,6-disubstituted fulvenes having the formula:

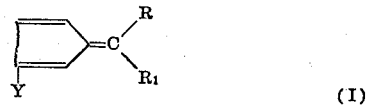

(I)

wherein R and $R_1$ are each a member selected from the group consisting of tertiary-alkyl, preferably tertiary-butyl, aryl, substituted aryl, for example, nitrophenyl, halophenyl and the like, and heteroaryl, for example, pyridyl, quinolyl, alkylpyridyl and the like, provided that at least one of said R and $R_1$ is heteroaryl; and Y is a member selected from the group consisting of hydrogen and $RR_1C(OH)$—, in which R and $R_1$ are as previously described. In the foregoing, phenyl is the preferred aryl and 2-pyridyl is the preferred heteroaryl.

The Diels-Alder reaction (diene synthesis) consists of the addition of a compound containing a double bond (usually activated by additional unsaturation in the $\alpha,\beta$-position) to the 1,4-positions of a conjugated diene system. The former is usually referred to as the "dienophile" and the latter as the "diene." The compound formed by the condensation of dienophile and diene is known as the "adduct."

In general terms, the novel adducts of this invention are obtained by the Diels-Alder condensation of two 6,6-disubstituted fulvenes of Formula I wherein R, $R_1$ and Y are as previously described although not necessarily the same in each of the two fulvenes. During the reaction, one of the fulvenes acts as a dienophile and the other as a diene. When Y is hydrogen in both fulvenes, the reaction is a dimerization analogous to the well-known dimerization of cyclopentadiene to dicyclopentadiene. The reaction scheme may be illustrated as follows:

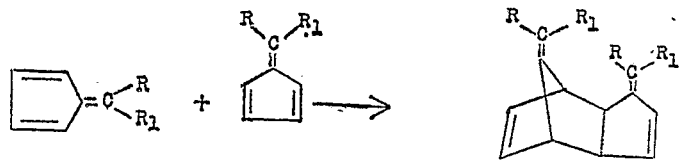

When Y in at least one of the fulvenes is the heretofore described $R-R_1$-hydroxymethyl group, the resulting adduct is possible of existence in one or more of the following position isomers:

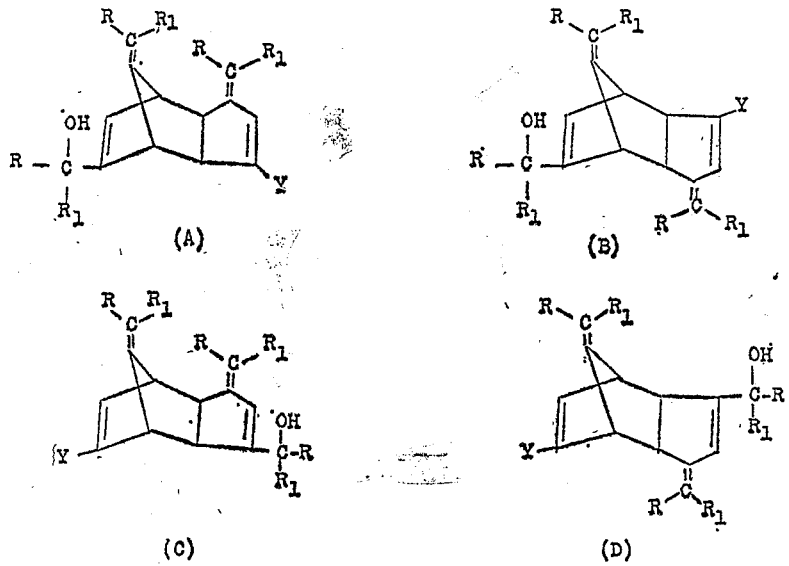

The foregoing reactions are self-initiating; no catalyst is required. Elevated temperatures may be advantageously employed to speed up the rate of reaction; the two fulvenes (diene and dienophile) may be simply heated together or heated in some solubilizing anhydrous solvent, e.g., benzene, ethyl acetate, ethanol and the like.

The starting fulvenes, which may be prepared and used in situ, are obtained from several methods. For example, those fulvenes wherein Y is hydrogen may be prepared by addition of an appropirate ketone of the formula R—CO—$R_1$ to cyclopentadiene in the presence of an alkali metal alkoxide, e.g., sodium ethoxide, or by condensation of an alkali metal derivative of cyclopentadiene, e.g., cyclopentadienyl sodium, with an R—CO—$R_1$ ketone in an alcoholic solvent, e.g., ethanol, at about 20–40° C., and generally over a prolonged period of time. The 2 - (R-R₁-hydroxymethyl)-6-R-6-R₁-fulvenes may be prepared by addition of cyclopentadiene to a solution of an appropriate R—CO—R₁ ketone in the presence of an alkaki metal alkoxide, e.g., sodium ethoxide, or by condensation of an alkali metal derivative of cyclopentadiene, e.g., cyclopentadienyl sodium, with an R—CO—R₁ ketone in an alcoholic solvent, e.g., ethanol, at about −10° to 5° C.

The novel Diels-Alder adducts of this invention absorb ultra-violet (U.V.) light and can be employed as effective U.V. screens when incorporated in suitable vehicles such as plastics and transparent film-forming compositions and oils.

Due to the structural configuration of the subject compounds, it is evident that their existence in the form of several stereoisomers is possible. It is naturally intended that all such isomers are included within the scope of this invention.

The preferred embodiments hereof are the Diels-Alder adducts of two 6,6-disubstituted fulvenes having the formula:

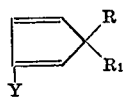

wherein R and R₁ are each a member selected from the group consisting of phenyl, 2-pyridyl and tertiary-butyl, provided that at least one of said R and R₁ is 2-pyridyl; and Y is a member selected from the group consisting of hydrogen, di-(2-pyridyl)hydroxymethyl and phenyl(2-pyridyl)hydroxymethyl.

The following examples are intended to illustrate, but not to limit, the scope of the present invention.

EXAMPLE I

Diels-Alder dimer of 6-(t-butyl)-6-(2-pyridyl)fulvene

A solution of 0.15 mole of cyclopentadienyl sodium and 0.1 mole of t-butyl 2-pyridyl ketone in 120 ml. of ethanol is allowed to stand at 25° C. for 65 hrs. A 7-gram sample of the oily product containing 6-(t-butyl)-6-(2-pyridine)fulvene is chromatographed on a column packed with 210 g. of neutral alumina. A first elution with petroleum ether ¹-ether (95/5) is discarded. A second elution with petroleum ether ¹-ether (50/50) is collected and evaporated in vacuo to a yellow oil. Trituration of the oil with petroleum ether gives a solid which is filtered and recrystallized from petroleum ether to give white crystalline 3a,4,7,7a - tetrahydro - 1,8 - bis[2,2 - dimethyl-1-(2-pyridyl)propylidene]-4,7-methanoindene, M.P. 138–9° C., $\lambda_{max.}^{MeOH}$ 256 m$\mu$ ($\epsilon$ 18,200), 261 m$\mu$ ($\epsilon$ 19,600)

Analysis.—Calcd. for: $C_{38}H_{34}N_2$: C, 85.26; H, 8.11; N, 6.63%. Found: C, 85.21; H, 8.21; N, 6.58%.

The NMR spectrum (CDCl₃) exhibited singlets at 0.8 and 1.2$\delta$ (t-butyl groups), multiplets at 2.4, 2.8, 3.1$\delta$ (alicyclic), 5.83 and 6.10$\delta$ (vinyl), 7.4$\delta$ (vinyl and pyridyl), 8.8 and 9.0$\delta$ ($\alpha$-pyridyl) corresponding to 18:4:3:7:2 protons, respectively.

EXAMPLE II

To a cold (ice bath) solution of sodium ethoxide which is prepared by dissolving 0.3 part by weight of sodium metal in 100 parts by volume of absolute ethanol is added 25 parts by weight of di-(2-pyridyl)ketone and then 15.7 parts by weight of freshly distilled cyclopentadiene over 20 minutes. The reaction solution is kept under nitrogen and darkens rapidly during the addition. It is stirred at ice-bath temperature for 2 hours after which crystals of product begin to appear. After the mixture is stirred for 15 hours at ice-bath temperature, the crystalline product is separated by filtration. The filtrate contains 6,6-(di-2-pyridyl)fulvene. The solid product amounts to 15 parts by weight of orange crystals melting at 141–144° C. One recrystallization from ethylacetate gives pure 2-[di-(2-pyridyl)hydroxymethyl] - 6,6 - di(2 - pyridyl)fulvene as orange prisms melting at 147–148° C.

EXAMPLE III

Diels-Alder dimer of 2-[di-(2-pyridyl)hydroxymethyl]-6,6-di(2-pyridyl)fulvene

A sample of 2-[di(2-pyridyl)hydroxymethyl]-6,6-di(2-pyridyl)fulvene is heated under reflux for four days in ethyl acetate. After removal of most of the solvent in vacuo, the solid precipitate is removed by filtration and leached three times with hot ethyl acetate. The insoluble material is then recrystallized from methanol-ethyl acetate to give white crystals of the adduct; M.P. 180–180.5° C.

$\lambda_{max.}^{MeOH}$ 248 m$\mu$ ($\epsilon$ 29,500), 255 (32,400), 262 (33,200), 268 (31,400), 322 (20,500)

$\lambda_{max.}^{CHCl_3}$ 3.05, 6.0, 6.3, 6.8, 6.98$\mu$

Analysis.—Calcd. for: $C_{54}H_{40}N_8O_2$: C, 77.86; H, 4.84; N, 13.45%. Found: C, 77.89; H, 4.96; N, 13.34%.

EXAMPLE IV

Diels-Alder adduct of 2 - (phenyl - 2 - pyridyl - hydroxymethyl)-6-phenyl-6-(2-pyridyl)fulvene and 6-phenyl-6-(2-pyridyl)fulvene To a cold (ice-bath) solution of sodium ethoxide which is prepared by dissolving 0.8 part by weight of sodium metal in 380 parts by volume of absolute ethanol is added 64 parts by weight of phenyl-2-pyridylketone and then 40 parts by weight of freshly distilled cyclopentadiene over twenty minutes. The reaction solution is kept under nitrogen and darkens rapidly during the addition. It is stirred at ice-bath temperature for two hours after which crystals of product begin to appear. After the mixture is stirred for fifteen hours under nitrogen at ice-bath temperature, the orange crystalline product, 2-(phenyl-2-pyridyl-hydroxymethyl) - 6 - phenyl - 6 - (2 - pyridyl)fulvene, is separated by filtration. The solid amounts to 49 parts by weight of organe crystals melting at 144° C. to 168° C. The filtrate, which contains residual 2-(phenyl-2-pyridyl-hydroxymethyl) - 6 - phenyl-6-(2-pyridyl)fulvene and 6-phenyl-6-(2-pyridyl)fulvene is evaporated in vacuo to a small volume. The resultant slurry is filtered and the solid material is leached several times with ethyl acetate. The insoluble material is recrystallized twice from methanol-ethyl acetate to give white crystalline adduct, M.P. 170–171° C.

EXAMPLE V

Diels-Alder dimer of 6-phenyl-6-(2-pyridyl)fulvene

To a solution of 900 ml. of absolute ethanol containing 48 g. (2.1 g. atoms) of dissolved sodium at ambient temperature is added 132 g. (2 moles) of cyclopentadiene under nitrogen. To the resulting solution is added, with stirring, a solution of 183 g. (1.0 mole) of 2-benzoyl-pyridine in 500 ml. of absolute ethanol over a 2 hr. period. A deep red color develops within a few minutes. The solution is allowed to stir an additional 15 min. after the addition is completed. The solvent is removed in vacuo to give a semi-solid mass which is then partitioned between water (ca. 200 ml.) and ether (ca. 500–750 ml.). The ether layer is separated, washed with water and dried over potassium carbonate. The ether is removed in vacuo to give a red glass which, upon trituration with ether, affords in four crops, about 161 g. of white solid. Recrystallization from ether affords the pure dimer, ---
¹ B.P. of the petroleum ether is 30–60° C.

3a,4,7,7a - tetrahydro - 1,8 - bis(α - 2-pyridylbenzylidene)-4,7-methanoindene; M.P. 116.5–132° C.

$\lambda_{max.}^{MeOH}$ 245 (ε 23,400), 280 (22,200) and 311 mμ (shl.) (13,700)

$\lambda_{max.}^{CHCl_3}$ 6.30, 6.40μ

*Analysis.*—Calcd. for $C_{34}H_{26}N_2$: C, 88.28; H, 5.67; N, 6.06%. Found: C, 88.13; H, 5.72; N, 5.91%.

The NMR spectrum (CDCl$_3$) exhibited complex multiplets centered at 8.56δ (two α-pyridyl protons), 7.7–6.7δ (sixteen aromatic protons), 6.08δ (four vinyl protons), 4.43δ (one aliphatic proton) and 3.47δ (three aliphatic protons).

What is claimed is:

1. The Diels-Alder adduct of two 6,6-disubstituted fulvenes having the formula:

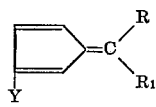

wherein R and R$_1$ are each a member selected from the group consisting of phenyl, 2-pyridyl and tertiary-butyl, provided that at least one of said R and R$_1$ is 2-pyridyl; and Y is a member selected from the group consisting of hydrogen, di(2-pyridyl)hydroxymethyl and phenyl(2-pyridyl)hydroxymethyl.

2. The Diels-Alder adduct of claim 1 wherein Y is hydrogen, and one of said R and R$_1$ is 2-pyridyl, the other being tertiary-butyl.

3. The Diels-Alder adduct of claim 1 wherein Y is hydrogen, and one of said R and R$_1$ is 2-pyridyl, the other being phenyl.

4. The Diels-Alder adduct of claim 1 wherein the two 6,6-disubstituted fulvenes are both 2-[di(2-pyridyl)hydroxymethyl]-6,6-di(2-pyridyl)fulvene.

5. The Diels-Alder adduct of claim 1 wherein one of the two 6,6-disubstituted fulvenes is 2-[phenyl-(2-pyridyl)hydroxymethyl]-6-phenyl-6-(2-pyridyl)fulvene and the other is 6-phenyl-6-(2-pyridyl)fulvene.

References Cited

UNITED STATES PATENTS 3,100,776   8/1963   Poos _____ 260—296

OTHER REFERENCES

Roszkowski et al.: Science, vol. 144, No. 3617, pp. 412–13, April 1964.

HENRY R. JILES, *Primary Examiner.*

ALAN L. ROTMAN, *Assistant Examiner.*

U.S. Cl. X.R.

260—45.8, 288

UNITED STATES PATENT OFFICE

CERTIFICATE OF CORRECTION

Patent No. 3,433,797                                                                 March 18, 1969

Chris Royce Rasmussen et al.

It is certified that error appears in the above identified patent and that said Letters Patent are hereby corrected as shown below:

Column 3, lines 23 to 28, the formula should appear as shown below:

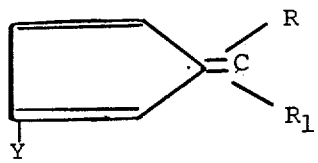

Column 4, line 47, "organe" should read -- orange --.

Signed and sealed this 31st day of March 1970.

(SEAL)
Attest:

Edward M. Fletcher, Jr.

Attesting Officer

WILLIAM E. SCHUYLER, JR.

Commissioner of Patents